(12) United States Patent
Barlett

(10) Patent No.: US 6,782,119 B1
(45) Date of Patent: Aug. 24, 2004

(54) SPACE PLANNING SYSTEM

(76) Inventor: Ernest Ross Barlett, 1492 Rusholme Crescent, Burlington, Ontario L7R 2G3 (CA)

( * ) Notice: Subject to any disclaimer, the term of this patent is extended or adjusted under 35 U.S.C. 154(b) by 686 days.

(21) Appl. No.: 09/606,175

(22) Filed: Jun. 29, 2000

(51) Int. Cl.$^7$ ................................................ G06K 9/00
(52) U.S. Cl. ...................................................... 382/113
(58) Field of Search ........................... 382/113; 434/73, 434/80; 235/462.03, 462.08, 464, FOR 102, 494

(56) References Cited

U.S. PATENT DOCUMENTS

| | | | |
|---|---|---|---|
| 3,659,353 A | 5/1972 | D'Agrosa | 35/16 |
| 3,994,079 A | 11/1976 | Mirman | 35/53 |
| 4,004,131 A * | 1/1977 | Oneil et al. | 235/494 |
| 4,275,449 A * | 6/1981 | Aish | 703/1 |
| 4,330,951 A | 5/1982 | Hauer | 40/124.2 |
| 4,527,981 A | 7/1985 | Chisum | 434/72 |
| 4,744,034 A | 5/1988 | Milstein | 364/464 |
| 4,806,102 A | 2/1989 | Pedersen et al. | 434/80 |
| 4,809,342 A * | 2/1989 | Kappner | 382/142 |
| 4,970,389 A | 11/1990 | Danforth et al. | 250/271 |
| 4,983,817 A | 1/1991 | Dolash et al. | 235/462 |
| 5,067,713 A | 11/1991 | Soules et al. | 273/149 |
| 5,082,365 A | 1/1992 | Kuzmick et al. | 356/28 |
| 5,291,395 A | 3/1994 | Abecassis | 364/401 |
| 5,331,140 A | 7/1994 | Stephany | 235/462 |
| 5,395,181 A | 3/1995 | Dezse et al. | 400/103 |
| 5,505,620 A | 4/1996 | Barlett | 434/73 |
| 5,601,431 A | 2/1997 | Howard | 434/79 |
| 5,725,253 A * | 3/1998 | Salive et al. | 283/67 |
| 5,808,284 A * | 9/1998 | Domanik | 235/462.01 |
| 5,847,971 A | 12/1998 | Ladner et al. | 364/512 |
| 6,094,509 A * | 7/2000 | Zheng et al. | 382/218 |

* cited by examiner

Primary Examiner—Leo Boudreau
Assistant Examiner—Tom Y. Lu

(57) ABSTRACT

There is disclosed a space planning assembly adapted to provide a human readable graphical furniture layout and a machine readable graphical furniture layout. The assembly has two-dimensional model furniture pieces scaled and shaped to represent the size of real furniture that adheres to the layout board by magnetic attraction. The furniture pieces each carry an invisible machine readable symbol which is scanned into a computer system to identify the actual furniture pieces, their relative location and orientation as represented by the model furniture pieces. The machine readable symbol has a central dot which identifies the location of the symbol, a radial line extending from the symbol to determine the angular orientation of the symbol and arc segments of concentric axial lines spaced radially outward of and at least partially encircling the central dot where the number of arc segments provide for a symbol identification number that represents a real furniture piece.

70 Claims, 8 Drawing Sheets

SPACE PLANNING SYSTEM

FIELD OF THE INVENTION

The present invention relates to a planning assembly for which a two dimensional image or graphical layout can be composed on a substrate from standardized multiple elements. In particular it relates to a space planning assembly preferably for office furniture and the like.

BACKGROUND OF THE INVENTION

Space planning assemblies are currently in existence on the market to facilitate the planning of office and other furniture within different environments. These space planning kits or assemblies are utilized by sales representatives who visit business sites and create a floor plan from which furniture is be ordered for that business.

One such space planning kit is disclosed in my U.S. Pat. No. 5,505,620 issued Apr. 9, 1996. In this space planning assembly, standardized sets of elements are placed on a magnetic layout board and adhere to the magnetic board by magnetic attraction. The elements are placed on the board to simulate the layout of office furniture for a business site. The board can then be turned over and copied on a photocopier to provide a visual image or graphical layout to a user of the furniture floor plan arrangement. The furniture elements used on the board are to scale and represent real furniture pieces supplied by the sales representative's business.

When the magnetic space planning kit is used in the field, the sales representative can try different furniture layouts in quick succession and immediately eliminate those layouts that are not suitable. At the same time the layouts that are desired can be kept for more detailed drawings and pricing by computer aided design programs. The kit also reduces repetitive sales visits to the customer.

While these space planning kits are of invaluable assistance to a space planning sales representative, there is no mechanisms to automate the furniture plan layout created on the space planning board. The current computer aided design require an operator to input the information from a sketch or drawing into a computer to allow the program to generated a computer aided drawing. To be used at a business site by a sales representative requires the sales representative to carry a portable computer fully loaded with the computer design software and trained in its use. However, when space is being planned at a site, several design changes are required before a tentative decision is reached on one or more designs. This makes the use of the computer in the field much more cumbersome than the space planning kits of my aforementioned U.S. Pat. No. 5,505,620.

Accordingly, there is a need to provide a space planning kit which has the flexibility required by a sales representative in the field to develop furniture layouts in the field and which also maybe quickly integrated into a computerized automated design system.

SUMMARY OF THE INVENTION

It is an object of the present invention to provide an assembly comprising a substrate and elements which can be placed on the substrate by a human to create a visual representation, such as, for example, a furniture layout, and which is machine readable for automated entry into a computer system, such as, for example, a computer aided design system.

The present relates to an assembly for creating a two dimension image on a substrate where the image is composed of standardized multiple elements each adapted for secure placement on the substrate and located relative to each other. Each of the elements has an upper surface with borders representing a plan view shape to expose the upper surface as a human visible representation of the relative position and orientation of the elements on the substrate. Each of the of the elements has applied at a predetermined position relative to the upper surface a machine readable identification symbol that identifies the element, the location of the of the element on the substrate, and the orientation of the element.

While the machine readable symbol may be applied to the upper surface as a stamping, embossing, engraving, scoring or printing. Alternatively, the application to the of the symbol relative to the surface may comprise embedding the symbol beneath the surface. Preferably, the symbol is printed on the outer surface of each element as a different color and preferably a color invisible, or not readily visible, to the naked eye.

It should be understood that by of standardized multiple elements it is meant sets or groups of elements where each element of the same group or set carries the same machine readable symbol. These groups of symbols may comprise various pieces of furniture, office equipment, draperies, windows, mats, cupboards, and even game puzzle pieces.

In accordance with the present invention the machine readable symbol comprises a dot applied to the predetermined position on the upper surface of the element to identify the location of the element relative to the substrate. The symbol further comprises a radial line applied to the upper surface of the element extending radially outward from the dot to define the angular orientation of the element. The symbol further has at least one line applied to the upper surface of the element that preferably intersects the radial line at a distance graduated along the radial line from the dot. The at least one line identifies the image or, in the preferred embodiment, a real furniture piece. The at least one line may alternatively not intersect with the radial direction line. The at least one line preferably at least partially encircles the dot as a ring adapted to be spaced from the dot. This at least one line is preferably divisible into a plurality of axially extending ring segments. The element has applied to the upper surface thereof a predetermined number of ring segments that identify the element where each of the elements are distinguished as different elements by the number of ring segments included in the symbol.

In accordance with one aspect of the present invention there is provided an assembly for creating a two dimension image comprising a substrate and standardized multiple elements. The standardized multiple elements are each adapted for secure placement on the substrate relative to each other and adapted to be scanned to form the image. Each of the elements has an upper surface with borders representing a plan view shape to expose the upper surface as a human visible representation of the relative position and orientation of the elements on the substrate. Each of the of the elements has applied at a predetermined position on the upper surface a machine readable identification symbol that identifies the element, the location of the of the element on the substrate, and the orientation of the element.

In accordance with another aspect of the present invention there is provided a two dimensional model furniture piece scaled and shaped to represent the size of a real furniture piece. The model furniture piece has an upper surface with borders representing a plan view shape of the real furniture piece. The model furniture piece is adapted for secure placement on a layout board, representative of a floor, to expose the upper surface as a human visible representation of the relative position and orientation of the model furniture piece relative to the layout board. The improvement comprises the model furniture piece having applied to a predetermined position on the upper surface a machine readable identification symbol that identifies the real furniture piece represented by the model furniture piece, the location of the real furniture piece on the floor, and the orientation of the real furniture piece on the floor.

In accordance with another aspect of the present invention there is provided a space planning assembly adapted to provide a human readable graphical space planing layout and a machine readable graphical space planing layout, comprising:

a layout board scaled to represent the area of a space to be furnished;

a plurality of sets of two dimensional model pieces scaled and shaped to represent real pieces; each model piece having an upper surface with borders representing a plan view shape of the real piece, each of the model pieces adapted for secure placement on the layout board relative to each other to provide a human readable graphical space planning layout which is readily scannable; and, each of the model pieces having applied to a predetermined position on the upper surface thereof a machine readable identification symbol that identifies the real piece represented by the model piece, the location of the real piece on the floor, and the orientation of the real piece on the floor.

In accordance with another aspect of the present invention there is provided a method of scanning into a computer system a two dimensional human readable image composed of standardized multiple elements located relative to each other on a substrate which are scanned to form the image where each of the elements has applied at a predetermined position relative to an upper surface thereof a machine readable identification symbol that identifies the element, the location of the of the element, and the orientation of the element relative to the layout board. The method comprises the steps of:

scanning the substrate in accordance with a first scanning pattern for capturing the machine readable identification symbols in a computer system;

confirming the validity of the symbol in the computer system discerning co-ordinate location information, symbol orientation information, and symbol identification information from the symbols; and storing the co-ordinate location information, symbol orientation information, for each symbol discerned in the computer system.

BRIEF DESCRIPTION OF THE DRAWINGS

The nature of the present invention will be better understood with reference to the accompanying diagrammatic drawings illustrating the preferred embodiments of the present invention, in which.

DETAILED DESCRIPTION OF EMBODIMENTS

Figure 1:
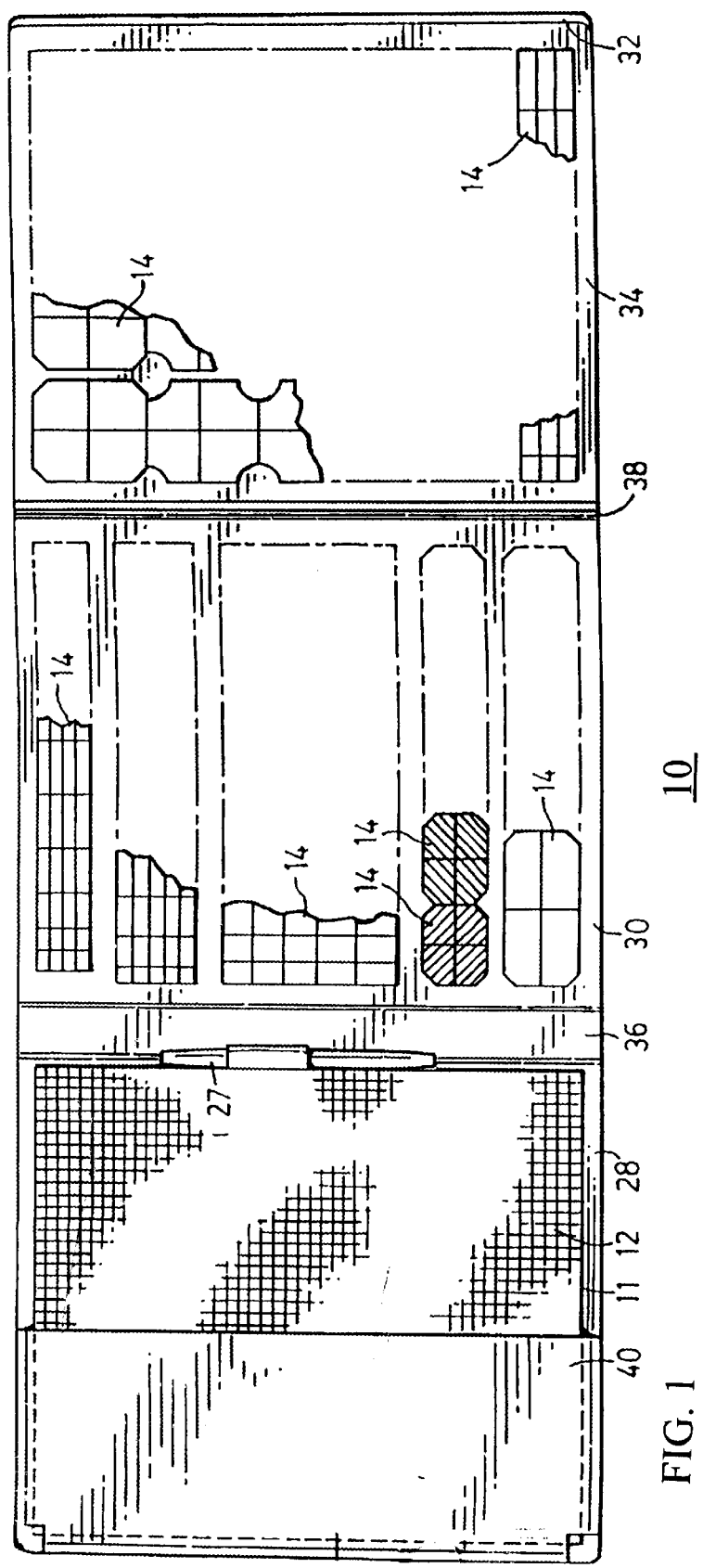
FIG. 1 is a plan view from above of an assembly that is a first embodiment comprising a folder adapted to store a removable element receiving substrate or layout board, and comprising four element storage members hingedly connected to one another.
Figure 2:
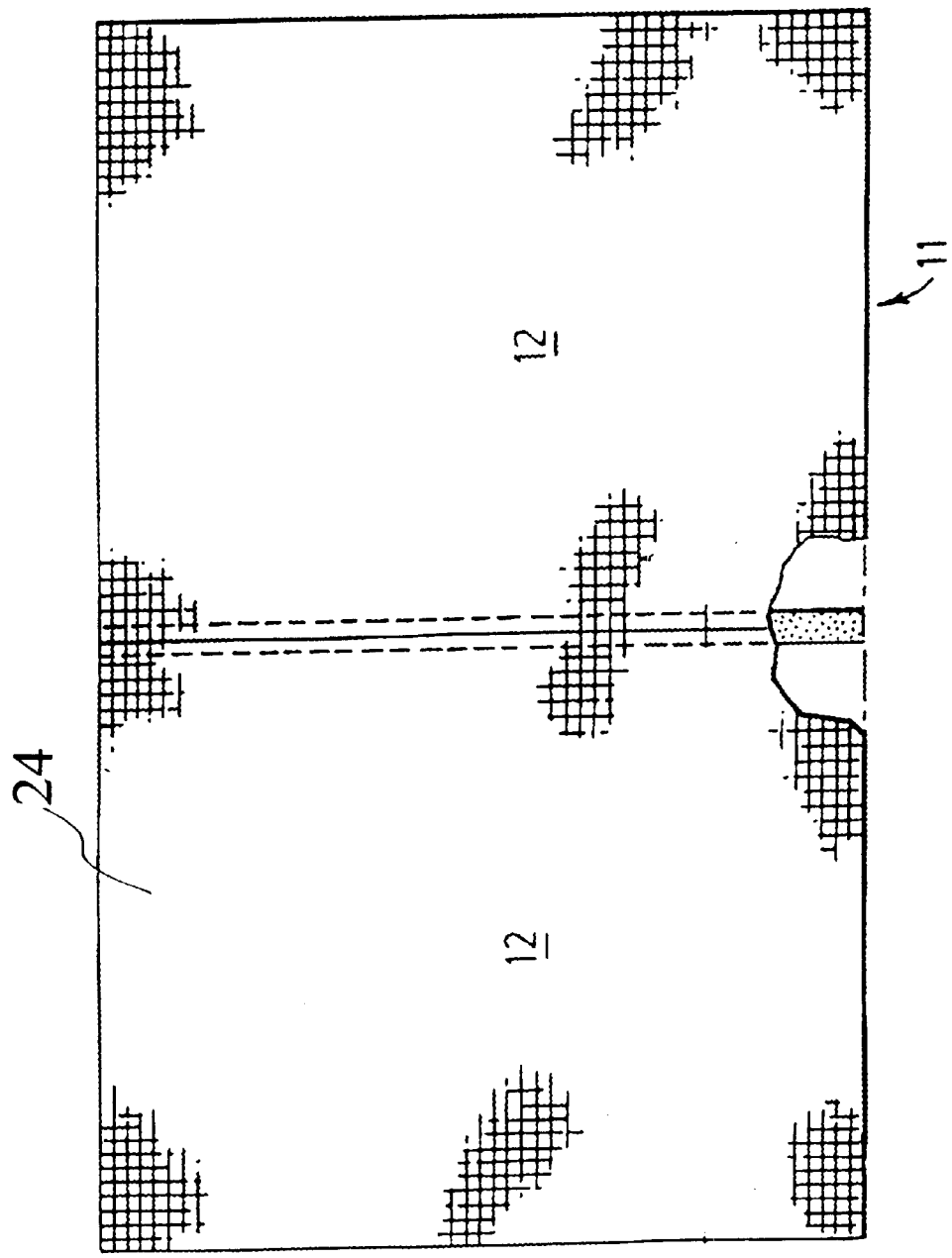
FIG. 2 is a plan view from above of the substrate or layout board as removed from the assembly and opened for use in planning an office furniture layout.

Referring now to FIGS. 1 and 2, the planning assembly 10 is illustrated for the planning of the layout of office furniture, but the fundamental structure involved is applicable to other planning assemblies, such as for kitchens, bathrooms, living accommodations, architectural layouts and landscaping, or to like structures such as annunciators requiring selectable movable information elements, or to toys or drawing instruments employing selectable movable decorative and information elements.

The assembly 10 has the form of a folder of convenient standard size when the leaves thereof are fully folded together, for example about 30.5 cm (12.2 ins) long and 26 cm (10.4 ins) wide; the thickness of a particular assembly folder will of course vary, depending upon the number of leaves it comprises. The assembly comprises a removable element receiving substrate or member 11, in commercial terms frequently referred to as a graph board or layout board, which for clarity of illustration is shown in outline only in FIG. 1 and is shown in more detail in FIG. 2. The layout board 11 providing an element receiving surface 12, upon which planning elements, preferably furniture pieces 14 (decorative and/or information elements in the case of other embodiments) are placed and magnetically adhered thereto.

Referring specifically to FIG. 2, the layout board 11 comprises two equal-size leaves or sheets 12 which are hinged together along their butting longer edges, so that they can be folded together, as illustrated, one on top of the other for storage, the leaves being opened to be coplanar for use. Each leaf comprises a support sheet to the upper surface of which is secured, as by an adhesive or by double-sided adhesive tape, a thin sheet of what is referred to herein as magnetizable metal, namely any metal or metal alloy that will cooperate with a permanent magnet of suitable strength to retain the magnet against movement thereon, even through an intervening thin sheet of non-magnetizable material. The exposed surface 24 of each sheet 12 is provided with a printed representation facilitating the location of elements placed thereon, and in this embodiment, in that it is a planning assembly, this consists of a square grid pattern of suitable cell size. A convenient scale is for example 1:48, so that the grid employs squares of side 6.25 mm (0.25 in), each of which is equivalent to a measurement of 30 cm (12 ins), so that when opened and flat the receiving member can be used to represent an area of 97.68 square meters (3,256 square feet). A ink pen 27 is provided as part of the assembly 10. Preferably the grid is printed in a light blue color to which most copy machines are at best weakly sensitive, so that once a layout has been established it can be photocopied with the background grid reduced in contrast, or even completely eliminated. In an assembly intended for a dedicated area, such as a floor of a multi-story office building, the surface 24 may have the repetitive floor plan permanently printed thereon.

In this embodiment the folder of FIG. 1 has a single-sided pocket leaf 28, two single-sided element storage or holder leaves 30 and 32, and one double-sided storage or holder leaf 34, the two leaves 28 and 30 being hingedly connected to a spine portion 36 of sufficient width to accommodate the three leaves 30, 32 and 34 when folded together, while the three leaves 30 and 32 are hingedly mutually connected together at a thinner spine portion 38. The leaf 28 has a pocket-forming member 40 providing a gussetted pocket into which the folded layout board 11 is inserted for storage.

Figure 3:
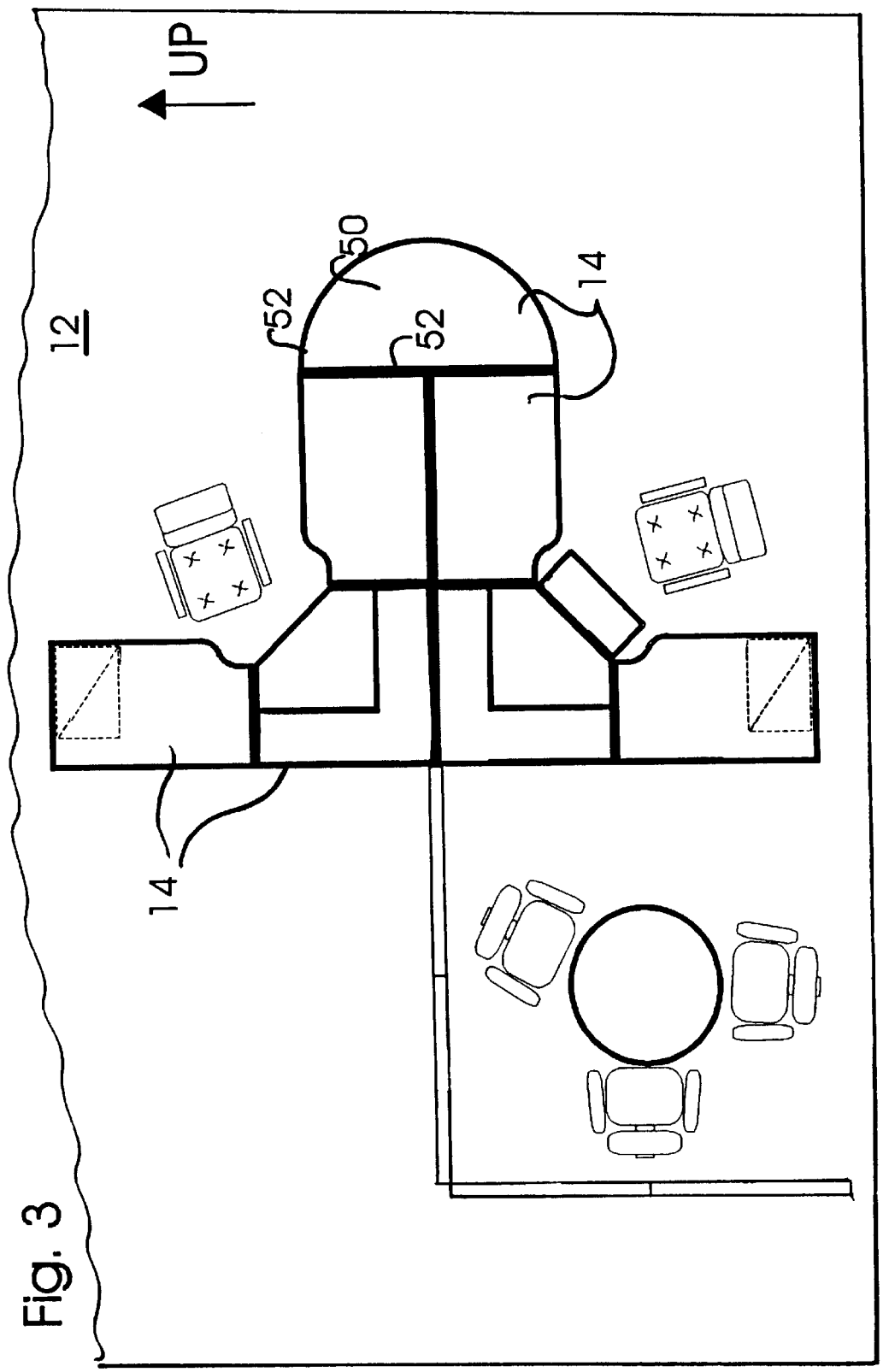
FIG. 3 is a plan view of an office furniture layout viewable to a human from arranging the elements or furniture pieces on the layout board.
Figure 4:
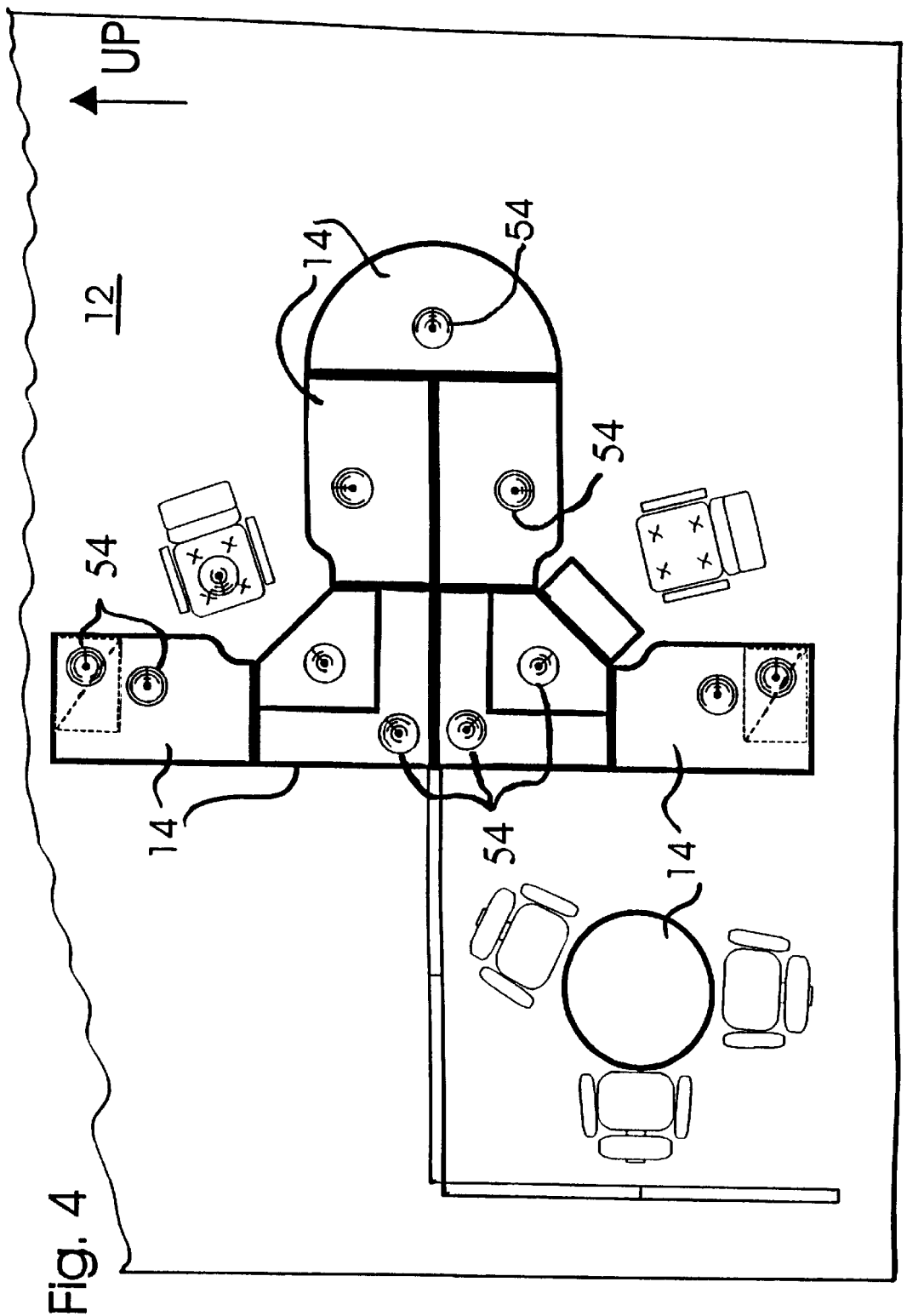
FIG. 4 is a plan view similar to FIG. 3 and shows in addition machine readable identification symbols in accordance with the present invention.
Figure 5:
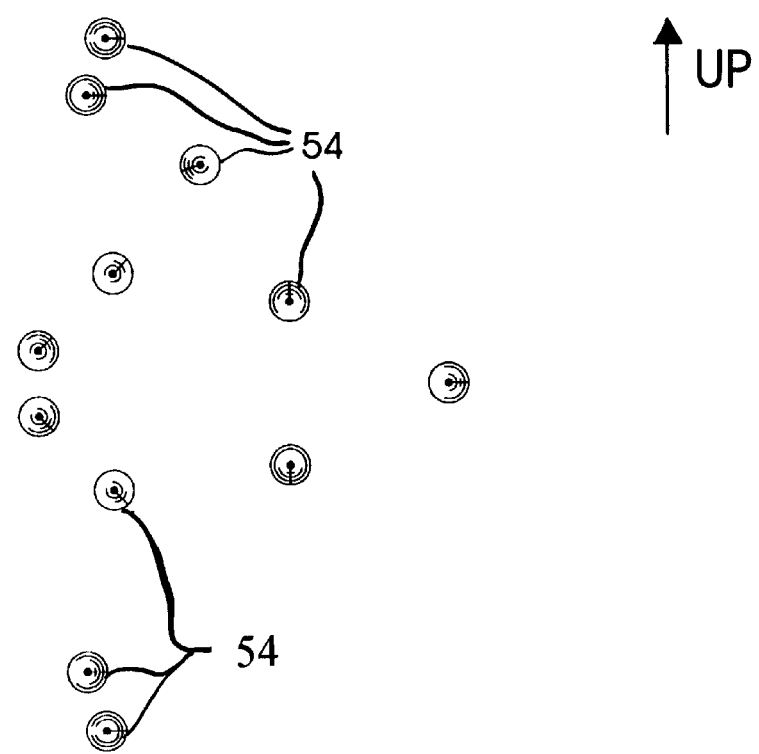
FIG. 5 is a plan view of the furniture layout of FIG. 4 showing only the furniture identification symbols as identified by the computer aided design system of the present invention.

Referring to FIGS. 3 to 5 the improvements in the present invention are now described. The space planning assembly 10 of the present invention is adapted to provide a human readable graphical furniture layout as shown in FIGS. 3 and 4 and a machine readable graphical layout as shown in FIGS. 4 and 5. The assembly includes the layout board 12 which is scaled to represent the area of the floor to be furnished. A plurality of sets of two-dimensional model furniture pieces 14 are scaled and shaped to represent real furniture pieces. Each model furniture piece has an upper surface 50 with borders 52 representing a plan view shape of the real furniture piece. The real furniture piece may also have other dimensional or information printed thereon so as to allow a sales representative and a potential customer to better appreciate the layout of the furniture. Each of the model furniture pieces 14 is adapted through a preferably metallic attraction for secure placement on the layout board 12 relative to each other to provide a human readable graphical layout which maybe readily scanned. Such a layout is shown in FIG. 3.

Referring to FIG. 4, a similar drawing is shown to that in FIG. 3 with the exception that each of the model furniture pieces 14 has applied to a predetermined position on the upper surface 50 thereof a machine readable identification symbol 54. Symbols 54 are shown on each of the major pieces and they identify the real furniture piece represented by that model furniture piece, the location of the relative furniture piece on the floor, and the orientation of the real furniture piece on the floor. These symbols are not shown in FIG. 3 because FIG. 3 preferably represents what a human would view when looking at the layout. That is to say the symbols are invisible to the human eye. With respect to FIG. 4 the symbols are shown as what would indicate or what one would see when shining an ultraviolet light onto the layout board containing the furniture pieces of FIG. 3. The ultraviolet light irradiates or illuminates the normally invisible color of each of the symbols for viewing by a human and scanner. The layout board of FIG. 4 viewable by human and by the machine is scanned into a computer system using a standard flatbed scanner fitted with an ultraviolet light source such that the scanner illuminates the symbols.

The symbols 54 are preferably printed onto the surface 50 of each of the pieces 14. Alternatively, the symbols 54 may be stamped, embossed, engraved, or scored onto the surface 50 of the furniture pieces 54. Alternatively, it may be possible to provide a symbol 54 that is subject to other means of scanning identification that would allow the symbol to be embedded directly underneath the surface 50 for either a touch sensitive or a magnetically type of sensing material.

Referring to FIG. 5, the placement of the symbols 54 relative to each other as would be scanned into a computer system and determined from the computer system is shown. Each furniture piece 14 has located on it at least one symbol 54. The symbol 54 is identical for each identical furniture piece 14 in the same set of furniture pieces. However, it should be understood that the symbol 54 is different for different groups of furniture pieces. Typically the diameter of the symbol 54 is 5 mm.

Figure 6A:
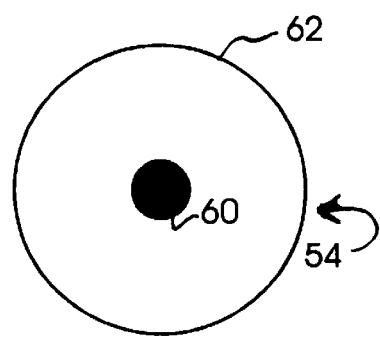
FIGS. 6a to 6d are plan views relating to the symbol identification strategy of the present invention.
Figure 6B:
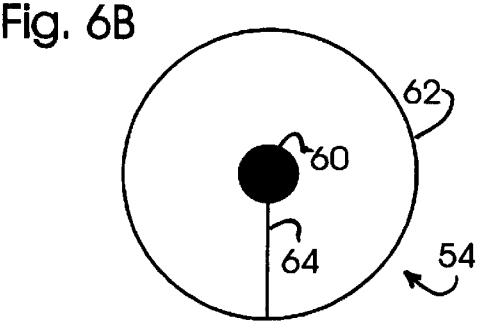
Figure 6C:
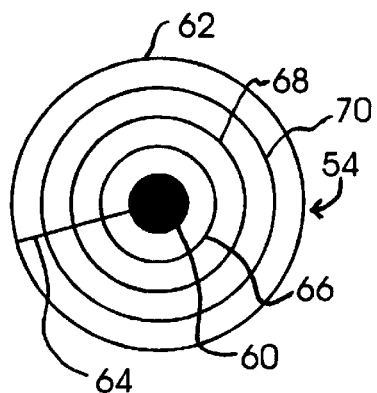

Referring to FIGS. 6A through 6C, the symbols 54 are described in more detail. In FIG. 6A, a portion common to each of the symbols is shown. That is the symbol comprises a central dot 60 and an outer concentric ring 62. Concentric ring 62 is spaced a predetermined distance of about 4 mm from the dot 60. The purpose of the dot 60 of the symbol 54 is to provide a circular pattern that is the order of 15 by 15 pixels such that the dot provides a center co-ordinate for the symbol relative to the layout board 12 and is not mistaken for a marking. The outer concentric ring 62 defines the outer perimeter into which other information relating to the symbol is given. The outer ring is about 5 mm in diameter and together with the dot 60 distinguishes a symbol 54 from a non-symbol marking. It should be understood that the symbol 54 shown in FIG. 6A provides the feature of relative location for the furniture piece. No information with respect to orientation or with respect to furniture identification is provided by the symbol of FIG. 6A.

Referring to FIG. 6B, the symbol 54 is augmented by a radially extending line 64 which extends outward from the center of the dot 60 to the peripheral ring 62. The purpose of the radial extending line 64 is to provide a relative orientation of the furniture piece represented by the symbol 54. Reference may be had to FIGS. 4 and 5 wherein each of the furniture pieces when arranged by a user on the layout board 12 shows the location of the symbol 54 and the orientation of the furniture piece and the symbol by the radially extending line 64.

Referring to FIG. 6C, the preferred embodiment of the symbol 54 includes the additions of three concentric rings spaced a predetermined equally radial distance from the center dot which are located within the outer ring 62. The rings include a first inner ring 66, an intermediate ring 68, and an outer ring 70. The rings 66, 68 and 70 have respective diameters of 2.5, 3.5 and 4.5 mm. In the preferred embodiment, the inner ring 66 is sub-divided or divisible into 6 ring segments. The intermediate ring 68 is divisible into 9 ring segments and the outer ring segment 70 is divisible into 12 ring segments in the preferred construction. This provides for a combination of (7×10×13=) 910 different symbol identifications which would represent different image elements or in the preferred embodiment furniture pieces 14.

It should be understood that the 910 combinations may be further augmented by increasing the number of concentric rings that surround axially the center dot 60.

Figure 6D:
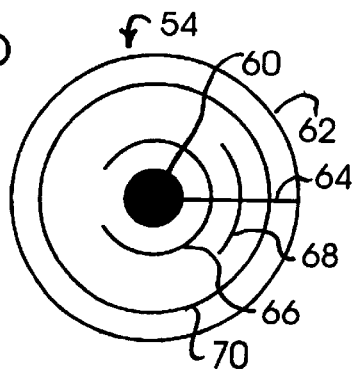

Referring to FIG. 6D, a complete symbol is shown which would identify a furniture piece 14. Symbol 54 shown in FIG. 6D locate the orientation of the symbol or the furniture piece by the center dot 60 on the grid system of the sheet 12. The symbol 54 also determines the information contained relative to this symbol 54 that would fall within outer concentric ring 62. The angular orientation of the symbol is determined to be directly to the right as shown by radial extending line 64. Intersecting this radial extending line 64 are 3 arcuate rings 66, 68, and 70. As shown in FIG. 6D the arcuate rings 66, 68, and 70 need not completely surround the center dot 60. A count of these ring segments gives a number associated with this system. Accordingly, the ID number for this system reading from the inner ring 66 out to the outer ring 70 is 5 inner ring segments 66, 2 middle ring segments 68, and 12 outer ring segments 70. Hence the furniture piece would be given the $I_D$ (5,2,12) with an orientation of 0 radial degrees located at the coordinates where center dot 60. Because the symbol 54 identifies a particular furniture piece, this would also identify to a computer or scanning software the actual location of the dot relative to the furniture piece so that the computer system could draw the human visual representation of that furniture piece immediately into a human readable drawing if required. Preferably, the ring segments of each ring are axially continuous and symmetrically disposed intersecting across the radial line 64. This simplifies the program used to identify the real furniture piece from the symbol. With respect to the angular orientation shown by the line 64 in FIG. 6D representing 0 degrees, the angular orientation of radial line 64 in FIG. 6B is offset to lie 90 degrees from the 0 degree angle of 6D and hence in 6B this angular representation would be in the order of 270 degrees.

Accordingly, these symbols which are not visible in the actual furniture pieces become visible when subjected to ultraviolet radiation in the preferred embodiment. The symbols 54 represent the co-ordinate location on the layout board 12 of the furniture piece, represent the actual furniture piece 14, and represent the orientation of the furniture piece on the layout board 11 and relative to the other furniture pieces 14.

Figure 7:
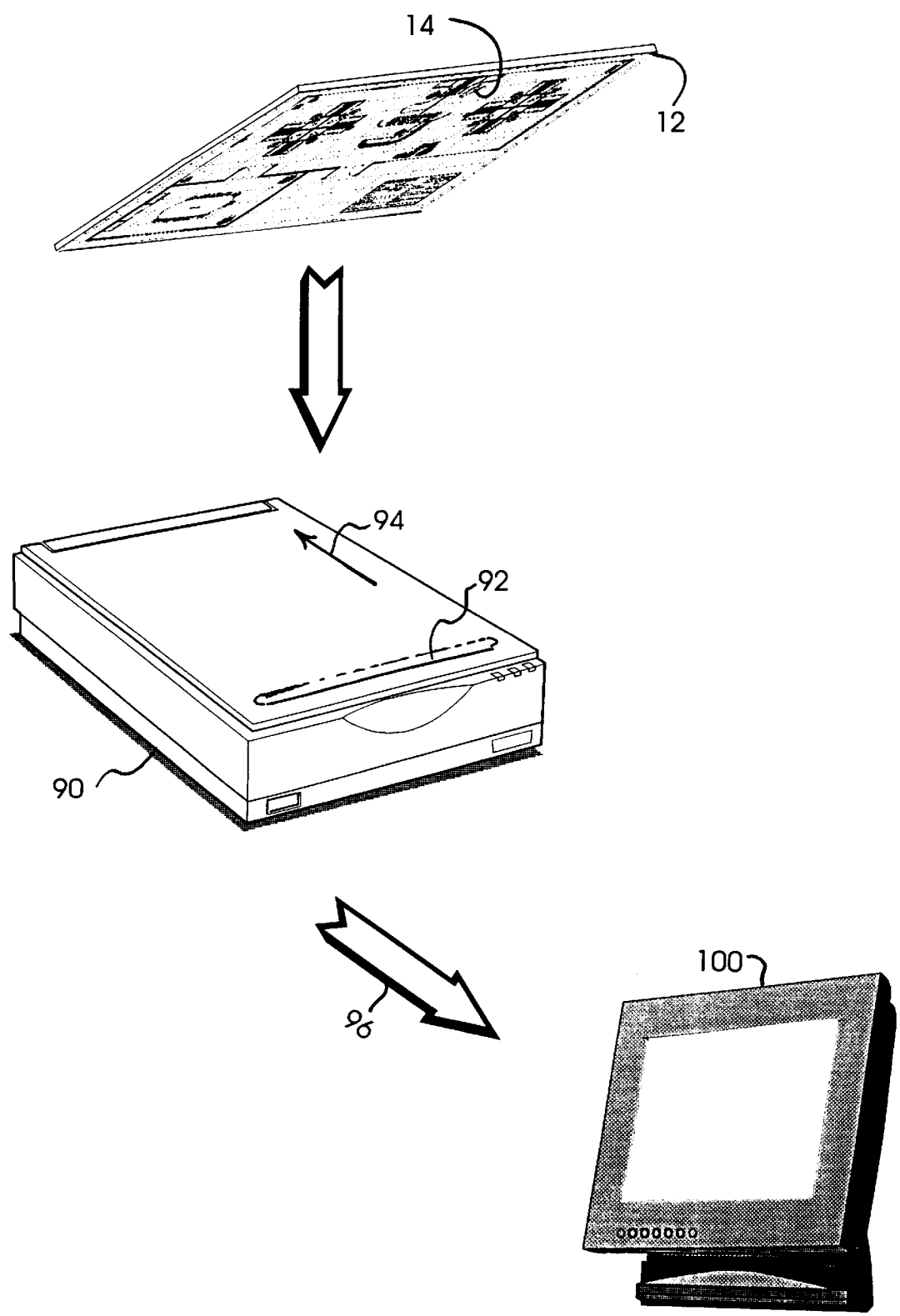
FIG. 7 is a schematic representation of a computer system for scanning the two dimensional image or furniture representation into a computer system; and, FIG. 8 is a flow chart of the method of operation of the computer system of FIG. 7.

Referring now to FIG. 7, the process by which a computer system scans the two dimensional human readable image as shown in FIG. 3 is described. The image is comprised of the furniture pieces 14 arranged on the sheet 12. Because the furniture pieces 14 adhere to the substrate 12 by the preferred mechanism of magnetic attraction, the substrate 12 with the furniture pieces 14 can be placed inverted onto a flat bed scanner 90. The flat bed scanner 90 includes an ultraviolet radiating light or lamp 92 which moves in the direction of arrow 94 to illuminate the furniture pieces 14, including the outer borders 52 and symbols 54, and forwards this illumination image along communication link 96 to the computer system shown generally at 100. It should be understood that the scanning system or scanner 90 may include sufficient hardware and software to discern the image 14 and provide a graphical interface file (GIF) file at the scanner 90. Preferably, the scanned information is transferred along communication line 96 to the computer 100 which creates the graphical image file.

Figure 8:
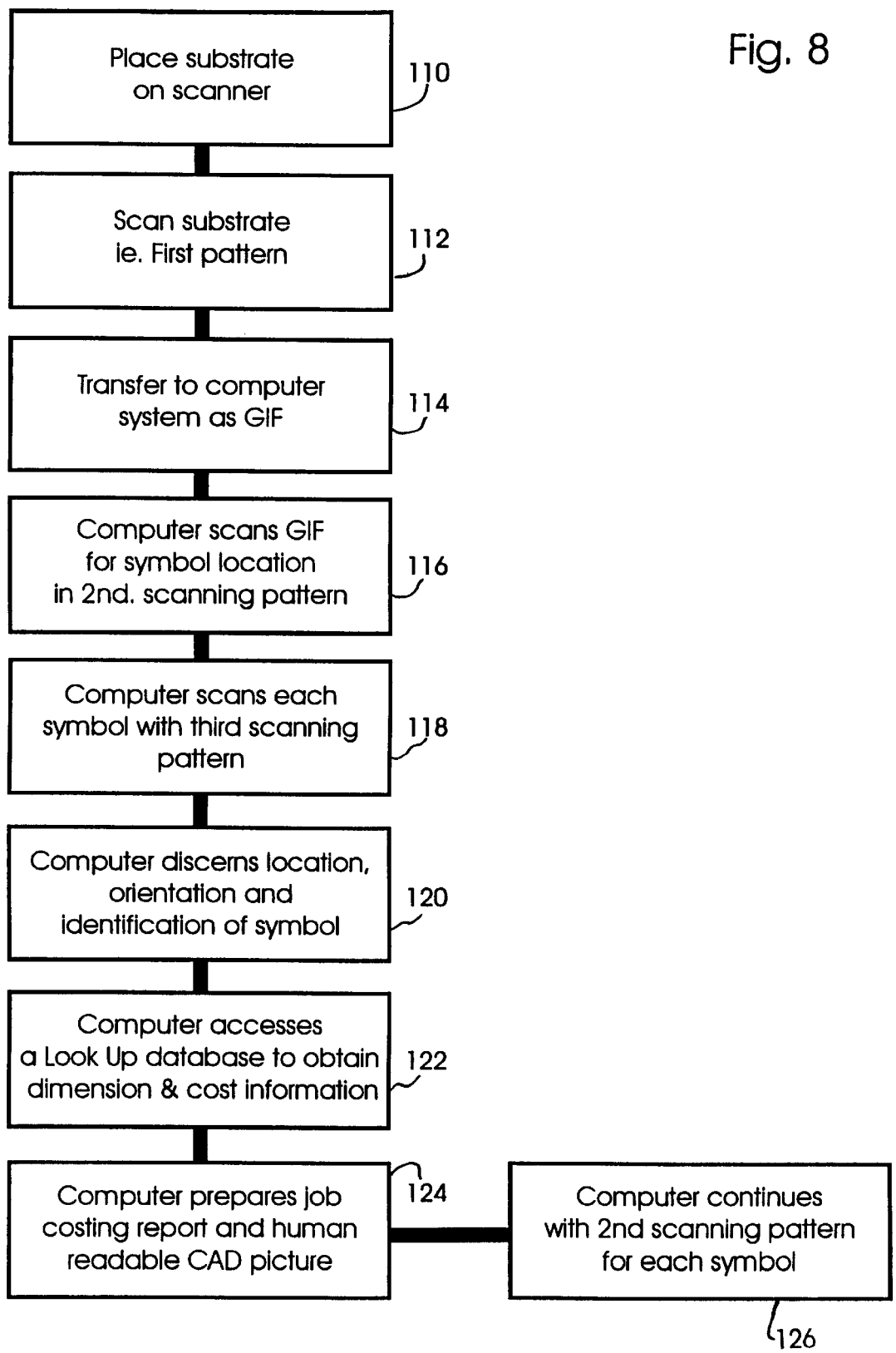

Referring to FIG. 8, the process or method by which the information is scanned is now described. In accordance with the method of the present invention, the two-dimensional human readable image as shown in FIG. 3 is composed of standard multiple furniture pieces 14 located relative to each other on the substrate 12 to form the image. Each of the elements has applied at a predetermined position relative to the upper surface 15 thereof a machine readable identification symbol 54 as shown in FIG. 4. The machine readable identification symbol identifies the element or the furniture piece, the location of the furniture piece, and the orientation of the furniture piece relative to the layout board 12 in accordance with the above referenced description for FIGS. 6A through 6D. In accordance with the method, the substrate 12 is placed on the scanner 90 and the scanner 90 performs a scan in accordance with a first standard scanning pattern. Typically this first pattern is a raster scan of the substrate in accordance with a predetermined number of dots per square inch. The step of placing the substrate on the scanner is shown in FIG. 8 at 110. The first scanning pattern is performed at 112 and the transfer of the graphical image file or the creation of the graphical image file capturing the human readable image and the machine readable image symbols 54 is shown at 114.

Next the computer system 100 performs at 116 a software scan of the graphical image file in accordance with a second scanning pattern to locate the machine readable symbols 54. In this fashion, the graphical image file represents the drawing or image shown in FIG. 4. The image file is then reviewed in a sequential fashion, preferably a raster type fashion, by a second scanning pattern. Once the central dots which are a predetermined size are determined by the second scanning pattern, the computer system alters the second scanning pattern when the machine readable symbol 54 is located to perform a third scanning pattern as shown at step 118. The computer then scans in a third scanning pattern which is a radial type of scanning pattern looking for the radial line 64 extending from the dot 60 so as to discern the orientation of the dot 60. The computer further scans in the direction radially from several points angularly about the dot to locate and ensure that an entire outer ring 62 surrounds the dot 60. This confirms to the computer that the dot 60 is in fact a symbol 54. When the radial line 64 is located as shown in FIG. 6B then the computer has confirmed the orientation of the symbol. Thus at this point the computer has determined the location of the symbol on the substrate 12 and it's orientation. Next the symbol starts to scan radially to determine how many of the arc segments are present in each of the concentric rings 66, 68 and 70 as shown in FIG. 6C. The computer then discerns the number of arc segments to provide an identification of the furniture piece. This is all performed at step 120.

The computer then accesses at step 122 a database to create a client/customer report which can be the number of pieces ordered and the costs associated with those pieces at step 124. This can then generate immediately a purchase order for the client. Additionally, the information can be used by the computer system to determine whether or not such pieces are in stock and the amount of time required to fill the order.

The computer then can if required generate a human readable image form of the system for display or print out in accordance with the representation shown in FIG. 3. Basically, the computer is scanning for the image file as shown in FIG. 5.

The computer stores the co-ordinate location information, the symbol orientation information for each symbol discerned in the computer system and then continues to scan the graphical image file in accordance with the second scanning pattern after each symbol has been discerned as shown at 126.

What is claimed is:

1. An assembly for creating a two dimension image comprising:

a substrate, and standardized multiple elements each adapted for secure placement on the substrate located relative to each other and adapted to be scanned to form said image, each of the elements having an upper surface with borders representing a plan view shape to expose the upper surface as a human visible representation of the relative position and orientation of the elements on the substrate, and each of the of the elements having applied at a predetermined position on the upper surface a machine readable identification symbol that identifies the elements, the location of the element on the substrate, and the orientation of the element, wherein the machine readable symbol comprises:

a dot applied to the predetermined position on the upper surface of the element to identify the location of the element relative to the substrate;

a radial line applied to the upper surface of the element extending radially outward from the dot to define the angular orientation of the element;

a plurality of rings adapted to be concentrically spaced from and about the dot, each of the rings being divisible into a plurality of axially extending ring segments, the element having applied to the upper surface thereof a predetermined number of ring segments from at least one of the rings that identify the element; and, an outer ring applied to the upper surface of the element to completely surround the dot radially spaced a predetermined distance therefrom to define an outer boundary for the symbol within which all symbol information is applied to the upper surface of the element.

2. The assembly of claim 1 wherein the machine readable symbol is applied selected from one of the group of stamping, embossing, engraving, scoring and printing.

3. The assembly of claim 2 wherein the border of each element is lined in a first color and the symbol has a machine readable second color that is different than the first color.

4. The assembly of claim 2 wherein the symbol is printed with an ink invisible to the human eye and readable under ultraviolet light.

5. An assembly for creating a two dimension image comprising:

a substrate, and standardized multiple elements each adapted for secure placement on the substrate located relative to each other and adapted to be scanned to form said image, each of the elements having an upper surface with borders representing a plan view shape to expose the upper surface as a human visible representation of the relative position and orientation of the elements on the substrate, and each of the of the elements having applied at a predetermined position on the upper surface a machine readable identification symbol that identifies the element, the location of the element on the substrate, and the orientation of the element, wherein the machine readable symbol comprises:

a dot applied to the predetermined position on the upper surface of the element to identify the location of the element relative to the substrate;

a radial line applied to the upper surface of the element extending radially outward from the dot to define the angular orientation of the element;

at least one ring adapted to be spaced from and to encircle the dot, the at least one ring being divisible into a plurality of axially extending ring segments, the element having applied to the upper surface thereof a predetermined number of ring segments that identify the element.

6. The assembly of claim 5 wherein the machine readable symbol comprises:

a plurality of rings adapted to be concentrically spaced from and about the dot, each of the rings being divisible into a plurality of axially extending ring segments, the element having applied to the upper surface thereof a predetermined number of ring segments from at least one of the rings that identify the element.

7. The assembly of claim 5 wherein a first ring segment for the at least one ring is applied to the upper surface of the element to intersect the radial line.

8. The assembly of claim 6 wherein each first ring segment for each ring is applied to the upper surface of the element to intersect the radial line.

9. The assembly of claim 8 wherein the ring segments are of a predetermined length for each ring.

10. The assembly of claim 8 wherein the ring segments are of a predetermined length and each succeeding outer ring is adapted to have additional ring segments.

11. The assembly of claim 10 wherein there are three rings divisible into ring segments, the inner most ring being divisible into six ring segments, the middle ring being divisible into nine ring segments, and the outermost ring being divisible into twelve ring segments.

12. The assembly of claim 5 wherein the machine readable symbol further comprises an outer ring applied to the upper surface of the element to completely surround the dot radially spaced a predetermined distance therefrom to define an outer boundary for the symbol within which all symbol information is applied to the upper surface of the element.

13. The assembly of claim 5 wherein the machine readable symbol further comprises an outer ring applied to the upper surface of the element to completely surround the dot radially spaced a predetermined distance therefrom to define an outer boundary for the symbol within which all symbol information is applied to the upper surface of the element.

14. The assembly of claim 6 wherein the machine readable symbol further comprises an outer ring applied to the upper surface of the element to completely surround the dot radially spaced a predetermined distance therefrom to define an outer boundary for the symbol within which all symbol information is applied to the upper surface of the element.

15. The assembly of claim 8 wherein the machine readable symbol further comprises an outer ring applied to the upper surface of the element to completely surround the dot radially spaced a predetermined distance therefrom to define an outer boundary for the symbol within which all symbol information is applied to the upper surface of the element.

16. The assembly of claim 11 wherein the machine readable symbol further comprises an outer ring applied to the upper surface of the element to completely surround the dot radially spaced a predetermined distance therefrom to define an outer boundary for the symbol within which all symbol information is applied to the upper surface of the element.

17. The assembly of claim 6 wherein the machine readable symbol is applied selected from one of the group of stamping, embossing, engraving, scoring and printing.

18. The assembly of claim 6 wherein the border of each element is lined in a first color and the symbol has a machine readable second color that is different than the first color.

19. The assembly of claim 17 wherein the symbol is printed with an ink invisible to the human eye and readable under ultraviolet light.

20. A two dimensional model furniture piece scaled and shaped to represent the size of a real furniture piece; the model furniture piece having an upper surface with borders representing a plan view shape of the real furniture piece, the model furniture piece adapted for secure placement on a layout board, representative of a floor, to expose the upper surface as a human visible representation of the relative position and orientation of the model furniture piece relative to the layout board, the improvement comprising the model furniture piece having applied to a predetermined position on the upper surface a machine readable identification symbol that identifies the real furniture piece represented by said model furniture piece, the location of the real furniture piece on the floor, and the orientation of the real furniture piece on the floor.

21. The two dimensional model furniture piece of claim 20 wherein the machine readable symbol comprises:
  a dot applied to the predetermined position on the upper surface of the model furniture piece to identify the location of the real furniture piece relative to the floor;
  a radial line applied to the upper surface of the model furniture piece extending radially outward from the dot to define the angular orientation of the real furniture piece; and,
  at least one line applied to the upper surface of the model furniture piece to intersect with the radial line at a distance graduated along the radial line from the dot, the at least one line identifying the real furniture piece.

22. The two dimensional model furniture piece of claim 21 wherein the machine readable symbol comprises:
  a dot applied to the predetermined position on the upper surface of the model furniture piece to identify the location of the real furniture piece relative to the floor;
  a radial line applied to the upper surface of the model furniture piece extending radially outward from the dot to define the angular orientation of the real furniture piece;
  a plurality of rings adapted to be concentrically spaced from and about the dot, each of the rings being divisible into a plurality of axially extending ring segments, the model furniture piece having applied to the upper surface thereof a predetermined number of ring segments from at least one of the rings that identify the real furniture piece; and,
  an outer ring applied to the upper surface of the model furniture piece to completely surround the dot radially spaced a predetermined distance therefrom to define an outer boundary for the symbol within which all symbol information is applied to the upper surface of the model furniture piece.

23. The two dimensional model furniture piece of claim 22 wherein the machine readable symbol is applied selected from one of the group of stamping, embossing, engraving, scoring and printing.

24. The two dimensional model furniture piece of claim 23 wherein the border of each model furniture piece is lined in a first color and the symbol has a machine readable second color that is different than the first color.

25. The two dimensional model furniture piece of claim 23 wherein the symbol is printed with an ink invisible to the human eye and readable under ultraviolet light.

26. The two dimensional model furniture piece of claim 20 wherein the machine readable symbol comprises:
  a dot applied to the predetermined position on the upper surface of the model furniture piece to identify the location of the model furniture piece relative to the floor;
  a radial line applied to the upper surface of the model furniture piece extending radially outward from the dot to define the angular orientation of the model furniture piece;
  at least one ring adapted to be spaced from and to encircle the dot, the at least one ring being divisible into a plurality of axially extending ring segments, the model furniture piece having applied to the upper surface thereof a predetermined number of ring segments that identify the real furniture piece.

27. The two dimensional model furniture piece of claim 26 wherein the machine readable symbol comprises:
  a plurality of rings adapted to be concentrically spaced from and about the dot, each of the rings being divisible into a plurality of axially extending ring segments, the model furniture piece having applied to the upper surface thereof a predetermined number of ring segments from at least one of the rings that identify the real furniture piece.

28. The two dimensional model furniture piece of claim 26 wherein a first ring segment for the at least one ring is applied to the upper surface of the model furniture piece to intersect the radial line.

29. The two dimensional model furniture piece of claim 27 wherein each first ring segment for each ring is applied to the upper surface of the model furniture piece to intersect the radial line.

30. The two dimensional model furniture piece of claim 29 wherein the ring segments are of a predetermined length for each ring.

31. The two dimensional model furniture piece of claim 29 wherein the ring segments are of a predetermined length and each succeeding outer ring is adapted to have additional ring segments.

32. The two dimensional model furniture piece of claim 31 wherein there are three rings divisible into ring segments, the inner most ring being divisible into six ring segments, the middle ring being divisible into nine ring segments, and the outermost ring being divisible into twelve ring segments.

33. The two dimensional model furniture piece of claim 21 wherein the machine readable symbol further comprises an outer ring applied to the upper surface of the model furniture piece to completely surround the dot radially spaced a predetermined distance therefrom to define an outer boundary for the symbol within which all symbol information is applied to the upper surface of the model furniture piece.

34. The two dimensional model furniture piece of claim 26 wherein the machine readable symbol further comprises an outer ring applied to the upper surface of the model furniture piece to completely surround the dot radially spaced a predetermined distance therefrom to define an outer boundary for the symbol within which all symbol information is applied to the upper surface of the model furniture piece.

35. The two dimensional model furniture piece of claim 27 wherein the machine readable symbol further comprises an outer ring applied to the upper surface of the model furniture piece to completely surround the dot radially spaced a predetermined distance therefrom to define an outer boundary for the symbol within which all symbol information is applied to the upper surface of the model furniture piece.

36. The two dimensional model furniture piece of claim 29 wherein the machine readable symbol further comprises an outer ring applied to the upper surface of the model furniture piece to completely surround the dot radially spaced a predetermined distance therefrom to define an outer boundary for the symbol within which all symbol information is applied to the upper surface of the model furniture piece.

37. The two dimensional model furniture piece of claim 32 wherein the machine readable symbol further comprises an outer ring applied to the upper surface of the model furniture piece to completely surround the dot radially spaced a predetermined distance therefrom to define an outer boundary for the symbol within which all symbol information is applied to the upper surface of the model furniture piece.

38. The two dimensional model furniture piece of claim 27 wherein the machine readable symbol is applied selected from one of the group of stamping, embossing, engraving, scoring and printing.

39. The two dimensional model furniture piece of claim 27 wherein the border of each model furniture piece is lined in a first color and the symbol has a machine readable second color that is different than the first color.

40. The two dimensional model furniture piece of claim 38 wherein the symbol is printed with an ink invisible to the human eye and readable under ultraviolet light.

41. A space planning assembly adapted to provide a human readable graphical space planning layout and a machine readable graphical space planning layout, comprising:
   a layout board scaled to represent the area of a space to be furnished;
   a plurality of sets of two dimensional model pieces scaled and shaped to represent real pieces; each model piece having an upper surface with borders representing a plan view shape of the real piece, each of the model pieces adapted for secure placement on the layout board relative to each other to provide a human readable graphical space planning layout which is readily scannable; and,
   each of the model pieces having applied to a predetermined position on the upper surface thereof a machine readable identification symbol that identifies the real piece represented by said model piece, the location of the real piece in the space, and the orientation of the real piece in the space.

42. The space planning assembly of claim 41 wherein the machine readable symbol comprises:
   a dot applied to the predetermined position on the upper surface of the model piece to identify the location of the real piece relative to the space;
   a radial line applied to the upper surface of the model piece extending radially outward from the dot to define the angular orientation of the real piece; and,
   at least one line applied to the upper surface of the model piece to intersect with the radial line at a distance graduated along the radial line from the dot, the at least one line identifying the real piece.

43. The space planning assembly of claim 42 wherein the machine readable symbol comprises:
   a dot applied to the predetermined position on the upper surface of the model piece to identify the location of the real piece relative to the space;
   a radial line applied to the upper surface of the model piece extending radially outward from the dot to define the angular orientation of the real piece;
   a plurality of rings adapted to be concentrically spaced from and about the dot, each of the rings being divisible into a plurality of axially extending ring segments, the model piece having applied to the upper surface thereof a predetermined number of ring segments from at least one of the rings that identify the real piece; and,
   an outer ring applied to the upper surface of the model piece to completely surround the dot radially spaced a predetermined distance therefrom to define an outer boundary for the symbol within which all symbol information is applied to the upper surface of the model piece.

44. The space planning assembly of claim 43 wherein the machine readable symbol is applied selected from one of the group of stamping, embossing, engraving, scoring and printing.

45. The space planning assembly of claim 44 wherein the symbol is printed with an ink invisible to the human eye and readable under ultraviolet light.

46. The space planning assembly of claim 44 wherein the border of each model piece is lined in a first color and the symbol has a machine readable second color that is different than the first color.

47. The space planning assembly of claim 41 wherein the machine readable symbol comprises:
   a dot applied to the predetermined position on the upper surface of the model piece to identify the location of the real piece relative to the space;
   a radial line applied to the upper surface of the model piece extending radially outward from the dot to define the angular orientation of the real piece;
   at least one ring adapted to be spaced from and to encircle the dot, the at least one ring being divisible into a plurality of axially extending ring segments, the model piece having applied to the upper surface thereof a predetermined number of ring segments that identify the real piece.

48. The space planning assembly of claim 47 wherein the machine readable symbol comprises:
   a plurality of rings adapted to be concentrically spaced from and about the dot, each of the rings being divisible into a plurality of axially extending ring segments, the model piece having applied to the upper surface thereof a predetermined number of ring segments from at least one of the rings that identify the real piece.

49. The space planning assembly of claim 47 wherein a first ring segment for the at least one ring is applied to the upper surface of the model piece to intersect the radial line.

50. The space planning assembly of claim 48 wherein each first ring segment for each ring is applied to the upper surface of the model piece to intersect the radial line.

51. The space planning assembly of claim 50 wherein the ring segments are of a predetermined length for each ring.

52. The space planning assembly of claim 50 wherein the ring segments are of a predetermined length and each succeeding outer ring is adapted to have additional ring segments.

53. The space planning assembly of claim 52 wherein there are three rings divisible into ring segments, the inner most ring being divisible into six ring segments, the middle ring being divisible into nine ring segments, and the outermost ring being divisible into twelve ring segments.

54. The space planning assembly of claim 52 wherein the machine readable symbol further comprises an outer ring applied to the upper surface of the model piece to completely surround the dot radially spaced a predetermined distance therefrom to define an outer boundary for the symbol within which all symbol information is applied to the upper surface of the model piece.

55. The space planning assembly of claim 47 wherein the machine readable symbol further comprises an outer ring applied to the upper surface of the model piece to completely surround the dot radially spaced a predetermined distance therefrom to define an outer boundary for the symbol within which all symbol information is applied to the upper surface of the model piece.

56. The space planning assembly of claim 48 wherein the machine readable symbol further comprises an outer ring applied to the upper surface of the model piece to completely surround the dot radially spaced a predetermined distance therefrom to define an outer boundary for the symbol within which all symbol information is applied to the upper surface of the model piece.

57. The space planning assembly of claim 50 wherein the machine readable symbol further comprises an outer ring applied to the upper surface of the model piece to completely surround the dot radially spaced a predetermined distance therefrom to define an outer boundary for the symbol within which all symbol information is applied to the upper surface of the model piece.

58. The space planning assembly of claim 52 wherein the machine readable symbol further comprises an outer ring applied to the upper surface of the model piece to completely surround the dot radially spaced a predetermined distance therefrom to define an outer boundary for the symbol within which all symbol information is applied to the upper surface of the model piece.

59. The space planning assembly of claim 47 wherein the machine readable symbol is applied selected from one of the group of stamping, embossing, engraving, scoring and printing.

60. The space planning assembly of claim 50 wherein the symbol is printed with an ink invisible to the human eye and readable under ultraviolet light.

61. The space planning assembly of claim 50 wherein the border of each model piece is lined in a first color and the symbol has a machine readable second color that is different than the first color.

62. A method of scanning into a computer system a two dimensional human readable image composed of standardized multiple elements located relative to each other on a substrate where each of the elements has applied at a predetermined position relative to an upper surface thereof a machine readable identification symbol that identifies the element, the location of the element, and the orientation of the element relative to the substrate, the method comprising the steps of:

scanning the substrate in accordance with a first scanning pattern for capturing the machine readable identification symbols in a computer system;

confirming the validity of the symbol in the computer system discerning co-ordinate location information, symbol orientation information, and symbol identification information from the symbols;

storing the co-ordinate location information, symbol orientation information, for each symbol discerned in the computer system; and wherein the step of scanning the substrate in accordance with a first scanning pattern into a computer system further comprises the steps of:

creating a graphical image file capturing the human readable image and the machine readable identification symbols;

scanning the graphical image file in a second scanning pattern to locate the machine readable symbols; and, scanning the located machine readable symbol with a third scanning pattern; the third scanning pattern comprising the steps of confirming the validity of the symbol and discerning co-ordinate location information, symbol orientation information, and symbol identification information.

63. The method of scanning of claim 62 further including the initial step of placing the substrate on a flatbed scanner surface and wherein the step of scanning the substrate in accordance with a first scanning pattern involves scanning an ultraviolet light over the layout board.

64. The method of scanning of claim 62 further including the initial step of placing the substrate on a flatbed scanner surface which performs the first scanning pattern.

65. The method of scanning as claimed in claim 62 further comprising the steps of:

altering the second scanning pattern when a machine readable symbol is located to the third scanning pattern; and, continuing the scan of the graphical image file in accordance with the second scanning pattern after each symbol is discerned.

66. The method of scanning of claim 62 further including the initial step of placing the substrate on a flatbed scanner surface which performs the first scanning pattern.

67. The method of scanning of claim 62 further including the initial step of placing the substrate on a flatbed scanner surface and wherein the step of scanning the substrate in accordance with a first scanning pattern involves scanning an ultraviolet light over the layout board.

68. The method of scanning of claim 62 wherein the second scanning pattern locates for each symbol a dot of predetermined size, and the third scanning pattern scans in different radial directions a predetermined distance outward from the dot to locate a radial line extending outwardly from the dot and at least one arcuate line segment extending axially around the dot.

69. The method of scanning of claim 68 wherein the second scanning pattern scan outwardly a predetermined distance to locate at least one ring that completely encircles the dot.

70. The method of scanning of claim 69 wherein the second scanning pattern scan radially outwardly from the dot to locate a plurality of rings concentrically spaced from and about the dot, each of the rings being divisible into a plurality of axially extending ring segments associated with the radial directions of the scan.

* * * * *